Patented Jan. 20, 1953

2,626,266

UNITED STATES PATENT OFFICE 2,626,266

PRODUCTION OF ARYLHALOSILANES

Arthur J. Barry, Midland, Mich., assignor to Dow Corning Corporation, Midland, Mich., a corporation of Michigan No Drawing. Application October 16, 1948, Serial No. 55,021. In Great Britain December 4, 1947

7 Claims. (Cl. 260—448.2)

This invention relates to the manufacture of aromatic halosilanes. It is particularly concerned with an improved process for the manufacture of an organohalosilane in which one valence of the silicon atom is satisfied by direct linkage to a carbon atom in a benzenoid hydrocarbon.

The preparation of phenyltrichlorosilane from benzene and trichlorosilane by interacting these materials at an elevated temperature in vapor phase has been described in the literature. In this type of process, phenyltrichlorosilane is not produced at temperatures of 500° C. and below.

I have shown in my copending application Serial No. 784,076 filed jointly with DePree and Hook, now Patent Number 2,591,668, that interaction between benzene and trichlorosilane is obtained to a limited extent at temperatures above 288.5° C. and under a pressure above the critical pressure of benzene.

As is known, halomonohydrosilanes, such as trichlorosilane (HSiCl₃), tend to undergo decomposition upon heating, with the elimination of molecular hydrogen and elementary silicon, and the formation of more highly halogenated silanes, such as silicon tetrachloride. Accordingly, to obtain phenyltrichlorosilane and other valuable derivatives by interaction of a mixture of benzene and trichlorosilane, the problem involved is one of controlling preferentially the rates of the desired type of reaction and this side reaction.

Objects of the present invention are to provide an improved process for effecting interaction of benzenoid hydrocarbons and trichlorosilane; for the production of aromatic organohalosilanes in high yield; and for the production of bis(silyl)-benzene compounds.

In accordance with the present invention, a benzenoid hydrocarbon is reacted with trichlorosilane in the presence of a boron halide, at a temperature above 230° C., under sufficient pressure that at least a portion of the reaction mixture is in a condensed phase. Under these conditions, aromatic halosilanes constitute a major portion of the reaction product.

Benzenoid hydrocarbons with which this invention is concerned include benzene, polyphenyls, and alkyl substituted benzenes, such as toluene, xylene, cumene, and mesitylene. Inasmuch as cracking of side chains is obtained with such materials as cumene and relatively pure products are obtained when the side chains contain but one carbon atom each, it is preferred to employ benzene, a polyphenyl, or the methyl derivatives of benzene as the hydrocarbon.

The boron halide may be added as such in the form of boron trichloride or trifluoride, or it may be produced in situ by the addition of material such as boric acid. The boron halide is preferably employed in a proportion of at least 0.1 per cent and generally less than 5 per cent, based on the total weights of the reactants, though larger proportions may be employed if desired. The catalyst is readily separable from the reaction product.

The process of the present invention is operable over a wide range of proportions of trichlorosilane and hydrocarbon in the reaction mixture. However, based upon economics and the law of mass action, it is preferable to have less than 20 mols of either of the reactants per mol of the other reactant.

When it is desired to direct the process toward the production of monosilyl derivatives of the benzenoid hydrocarbons, it is preferable to operate with approximately equimolecular ratios of the silane and the hydrocarbon. For example, an equimolecular mixture of trichlorosilane and benzene yields a preponderance of phenyltrichlorosilane, and minor proportions of diphenyldichlorosilane and of bis(trichlorosilyl)benzene.

The use of mixtures which contain more than one molecular equivalent of the silane per mol of hydrocarbon result in an increase in the amount of polysilyl derivatives of the hydrocarbon. Thus, with these larger proportions of the silane, substantially increased amounts of bis- and tris-silyl hydrocarbons are obtained without appreciable decrease in the amount of the monosilyl hydrocarbon produced.

In a preferred form of the present invention, the reaction mixture is heated at a temperature above 230° C. At temperatures above 420° C. no advantage over conducting the reaction without the catalyst is obtained. In the range between 250° and 300° C. optimum results are obtained with respect both to the percent yield and to the ratio of organic silane derivatives to silicon tetrachloride by-products. The pressure employed should be sufficient to ensure that at the temperature of operation at least a portion of the reaction mixture is in a condensed phase. Thus, when the operation is conducted at a temperature below the critical temperature of the hydrocarbon the pressure should be sufficient to maintain some liquid phase. When the temperature is above the critical temperature of the hydrocarbon the pressure should be at least the critical pressure thereof whereby a condensed phase is present, though present day knowledge of the nature of this state is incomplete. This may be accomplished in various ways, such as by introducing the reactants continuously into the reaction zone under pressure, or by operating under autogenous pressure in a closed system. The indicated phase condition is obtained when there is employed at least 1.2 gram mols of reactants per liter of reactor volume.

The following examples illustrate how the process of the invention may be carried into effect.

EXAMPLE 1

A series of runs was made, in each of which a mixture of 1402 grams of benzene, 2440 grams of trichlorosilane and boron trichloride was heated for 16 hours in a 14.4 liter bomb. In each run, some condensed phase was present during the heating period. Thereafter, the bomb was cooled, and the product was fractionally distilled.

Table I shows the varied conditions of the runs and the results.

*Table I*

| Run No. | Gms. $BCl_3$ | Temp., °C. | Max. press., lbs./in.$^2$ | Total product, gms. | $C_6H_5SiCl_3$, gms. |
|---|---|---|---|---|---|
| 1 | 40 | 251 | 600 | 578 | 467 |
| 2 | 39 | 275 | 900 | 1,468 | 1,243 |
| 3 | 40 | 278 | 840 | 1,886 | 1,684 |
| 4 | 90 | 300 | 980 | 1,773 | 1,495 |
| 5 | 40 | 318 | 1,230 | 1,782 | 1,405 |
| 6 | 45 | 355 | 1,240 | 1,750 | 1,540 |
| 7 | 41 | 399 | 1,500 | 1,655 | 1,264 |
| 8 | 4 | 300 | 910 | 722 | 443 |

The residues in runs 1, 2, 5 and 7 from the distillation of phenysilicon trichloride were mixed and distilled. There were thereby obtained 309 grams of diphenyldichlorosilane and 284 grams of bis(trichlorosilyl) benzenes.

EXAMPLE 2

A mixture of 1402 grams of benzene, 4880 grams of trichlorosilane, and 64 grams of boron trichloride was heated at an average temperature of 300° C. for 16 hours in a 14.4 liter bomb. The maximum pressure attained within the bomb during the heating period was 1500 pounds per square inch.

Fractional distillation of the reaction product yielded 1478 grams of phenyltrichlorosilane, 436 grams of bis(trichlorosilyl)benzene, 166 grams of diphenyldichlorosilane, 143 grams of $$C_6H_5SiCl_2C_6H_4SiCl_3$$

and 189 grams of organosilicon halides which were an oily material distilling above 226° C. at 30 millimeters absolute pressure.

Two isomeric bis(trichlorosilyl)benzenes were obtained. One is a liquid boiling at 160° C. at 30 millimeters absolute pressure and having a density of 1.497 at 20° C. The other is a white crystalline material of needle habit and apparently triclinic structure. The boiling point of the latter is 168° C. at 30 millimeters pressure.

The $C_6H_5SiCl_2C_6H_4SiCl_3$ which was obtained is a liquid of 1.386 density and a boiling point of 226° C. at 30 millimeters.

EXAMPLE 3

A mixture of 390 grams benzene, 6775 grams trichlorosilane and 72 grams boron trichloride was heated at an average temperature of 300° C. for 16 hours in a 14.4 liter bomb. The maximum pressure attained within the bomb during the heating period was 1530 pounds per square inch.

Fractional distillation of the reaction product yielded 1,2-bis(trichlorosilyl)ethane, B. P. 199° C., and 1,1-bis(trichlorosilyl)ethane, B. P. 182° C., 447 grams phenyltrichlorosilane, 265 grams bis(trichlorosilyl) benzene, 63 grams diphenyldichlorosilane, 77 grams $C_6H_5SiCl_2C_6H_4SiCl_3$, and 190 grams of organosilicon halides distilling above 226° C. at 30 millimeters absolute pressure.

1,1-bis(trichlorosilyl)ethane is a colorless liquid having a specific gravity of 1.479 at 20° C. It reacts with methyl magnesium bromide to produce 1,1-bis(trimethylsilyl)ethane, a colorless liquid, and 1,1-bis(dimethylchlorosilyl)ethane. The hydrolysis product of the latter is a colorless liquid polymer comprising repeating units of the structure $$\begin{array}{ccc} CH_3 & CH_3 & CH_3 \\ | & | & | \\ -Si-C-Si-O- \\ | & | & | \\ CH_3 & H & CH_3 \end{array}$$

EXAMPLE 4

A mixture of 3744 grams benzene, 1626 grams trichlorosilane and 54 grams boron trichloride was heated in a 14.4 liter bomb for 16 hours at an average temperature of 290° C. The maximum temperature attained within the bomb during the heating period was 1280 pounds per square inch.

The product was fractionally distilled, whereby there were obtained 1200 grams phenyltrichlorosilane and 352 grams of distillation residue containing organosilicon chlorides.

EXAMPLE 5

This example illustrates the results obtained when mixtures of benzene, trichlorosilane and boron trifluoride were reacted under the conditions otherwise as stated in Example 1. Table II presents the results obtained in a series of runs conducted at the temperatures indicated.

*Table II*

| Gms. $BF_3$ | Temp., °C. | Pressure, lbs./in.$^2$ | Total product, gms. | $C_6H_5SiCl_3$ gms. | $C_6H_5SiCl_2F$ gms. |
|---|---|---|---|---|---|
| 46 | 264 | 860 | 1,865 | 1,343 | 143 |
| 64 | 304 | 1,020 | 1,844 | 1,358 | 145 |
| 39 | 329 | 1,180 | 1,709 | 1,185 | 77 |
| 41 | 360 | 1,400 | 1,567 | 1,304 | 67 |
| 113 | 375 | 1,450 | 1,340 | 854 | 214 |
| 94 | 317 | 1,100 | *1,576 | 1,024 | 100 |

*This product was found to contain 75 grams of phenylchlorodifluorosilane.

EXAMPLE 6

A mixture of 1402 grams of benzene, 2440 grams trichlorosilane, and 39 grams boric acid was heated at an average temperature of 290° C. for 16 hours in a 14.4 liter bomb. The maximum pressure attained within the bomb during the heating period was 1025 pounds per square inch.

EXAMPLE 7

Fractional distillation of the product yielded 1298 grams phenyltrichlorosilane and 260 grams distillation residue which contained organosilicon chlorides.

A mixture of 1402 grams benzene and 2440 grams trichlorosilane and 39 grams $B_2O_3$ was heated at an average temperature of 294° C. for 16 hours in a 14.4 liter bomb. The maximum pressure developed within the bomb during the heating period was 1050 pounds per square inch.

Fractional distillation of the reaction product yielded 977 grams phenyltrichlorosilane and 183 grams of distillation residue which contained organosilicon chlorides.

EXAMPLE 8

A mixture of 1660 grams of toluene, 2440 grams of trichlorosilane, and 42 grams of boron trichloride was heated in a bomb of 14.4 liters capacity for 16 hours at an average temperature of 300° C. During the heating period the maximum pressure developed within the bomb was 920 pounds per square inch.

Fractional distillation of the product yielded 1292 grams of tolyltrichlorosilane, 75 grams of phenyltrichlorosilane, 97 grams of bis(trichlorosilyl)toluene, which was a liquid distilling at about 166° C., at 30 millimeters and 458 grams of distillation residue containing other isomers of the latter, ditolyldichlorosilane and other organosilicon halides.

EXAMPLE 9

A mixture of 250 grams of mesitylene, 542 grams of trichlorosilane, and 9 grams of boron trichloride was heated for 17 hours at a temperature of from 300° to 315° C. in a 2.4 liter bomb. The maximum pressure developed during the heating period was 1120 pounds per square inch.

By distillation there were obtained 87 grams of mesityltrichlorosilane which was found to boil at 142° C. at 30 millimeters and also a minor proportion of xylyltrichlorosilane.

EXAMPLE 10

The process of Example 1 was repeated substituting cumene for benzene. The product was distilled and the products recovered were phenyltrichlorosilane, tolyltrichlorosilane and cumyltrichlorosilane.

EXAMPLE 11

A mixture of 2776 grams biphenyl, ($C_6H_5.C_6H_5$), 2440 grams trichlorosilane and 59 grams boron chloride was maintained at an average temperature of 270° C. for 16 hours in a 14.4 liter bomb. During this time, the maximum pressure developed within the bomb was 800 pounds per square inch.

The reaction product was fractionally distilled, and yielded 1741 grams of biphenylyltrichlorosilane, ($C_6H_5.C_6H_4SiCl_3$), and 837 grams of distillation residue which contained organosilicon chlorides.

Two isomeric biphenylyltrichlorosilanes were obtained. One is a liquid which distilled at from 200° to 202° C. at 30 millimeters absolute pressure, and the other is a white, crystalline material which distilled at from 205° to 207° C. at 30 millimeters.

EXAMPLE 12

A reaction mixture consisting of 38 parts by weight of trichlorosilane and benzene in equimolecular proportions and 62 parts of boron trichloride was placed in an autoclave of volume equal to three times the volume of the mixture. The autoclave was closed and heated for 15 hours at from 271° to 276.5° C. It was then cooled, and opened to permit escape of the boron trichloride. The reaction product was distilled, whereby phenyltrichlorosilane was obtained as product.

EXAMPLE 13

A mixture of 1656 grams toluene, 2440 grams trichlorosilane and 53 grams boron chloride was heated in a 14.4 liter bomb for 16 hours at an average temperature of 261° C. During the heating period, the maximum pressure developed within the bomb was 810 pounds per square inch.

Fractional distillation of the reaction product yielded 1772 grams tolyltrichlorosilane and 443 grams of residue which contained trichlorosilyl derivatives of toluene.

In each of the above examples there were recovered unreacted silane and hydrocarbon, as well as limited amounts of silicon tetrachloride.

That which is claimed is:

1. The process which comprises reacting a benzenoid hydrocarbon free of aliphatic unsaturation in any side chains with trichlorosilane in the presence of a boron halide at a temperature above 230° C., at least a portion of the reaction mixture being in condensed phase, whereby to produce a trichlorosilyl derivative of the benzenoid hydrocarbon.

2. The process which comprises reacting a benzenoid hydrocarbon free of aliphatic unsaturation in any side chains with trichlorosilane in the presence of a boron halide at a temperature of from 230° C. to 420° C., at least a portion of the reaction mixture being in condensed phase, whereby to produce a trichlorosilyl derivative of the hydrocarbon.

3. The process which comprises reacting benzene with trichlorosilane in the presence of a boron halide at a temperature of from 230° C. to 420° C., at least a portion of the reaction mixture being in condensed phase, whereby to produce phenyltrichlorosilane.

4. The process which comprises reacting toluene with trichlorosilane in the presence of a boron halide at a temperature of from 230° C. to 420° C., at least a portion of the reaction mixture being in condensed phase, whereby to produce tolyltrichlorosilane.

5. The process which comprises reacting biphenyl with trichlorosilane in the presence of a boron halide at a temperature of from 230° C. to 420° C., at least a portion of the reaction mixture being in condensed phase, whereby to produce biphenylyltrichlorosilane.

6. The method which comprises reacting a benzenoid hydrocarbon free of aliphatic unsaturation in any side chains with trichlorosilane in the presence of boron trifluoride at a temperature of from 300–400° C. in a closed system under autogenous pressure whereby to produce a trichlorosilane derivative of said hydrocarbon.

7. The method which comprises reacting a benzenoid hydrocarbon free of aliphatic unsaturation in any side chains with trichlorosilane in the presence of boron halide at a temperature of from 300–400° C. in a closed system under autogenous pressure whereby to produce a trichlorosilane derivative of said hydrocarbon.

ARTHUR J. BARRY.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1946 |
| 2,407,181 | Scott | Sept. 3, 1946 |
| 2,443,898 | Ellingboe | June 22, 1948 |

OTHER REFERENCES

A. L. Clark, Chem. Revs. 23, 1–15 (1938).

O. Maass., Chem. Revs. 23, 17–27 (1938).

McIntosh and Maass., Can. J. Research B16, 289–302 (1938).

Holder and Maass., Can. J. Research B16, 453–67 (1938).

Bradley, Browne, and Hale, Phys. Rev. 26, 470–482 (1908).